March 31, 1970     L. J. KENNEDY     3,503,094
FISH CLAMPING TABLES
Filed July 29, 1968
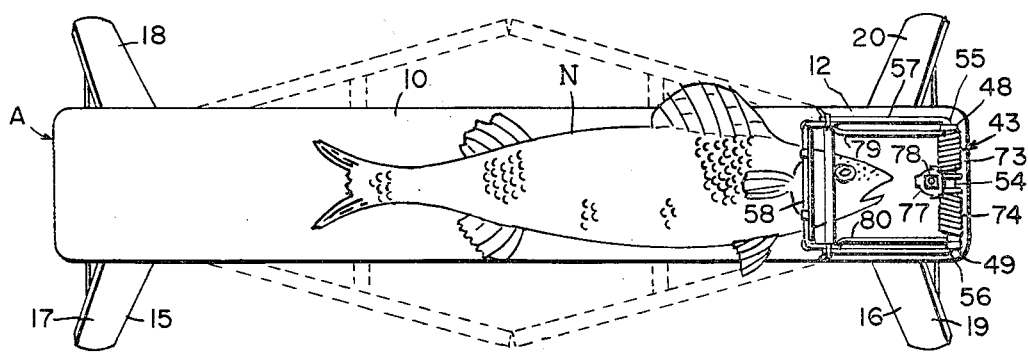
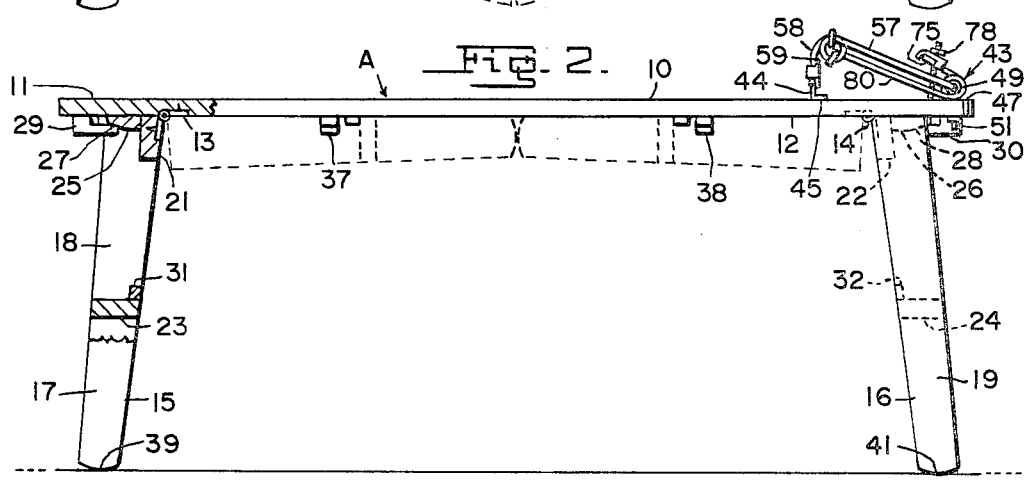
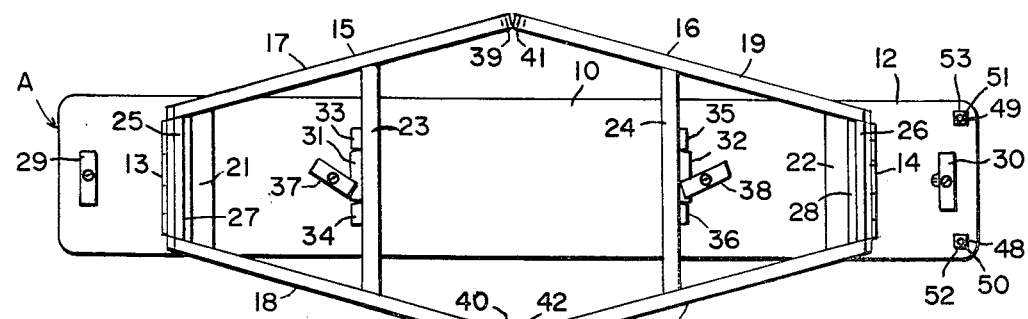
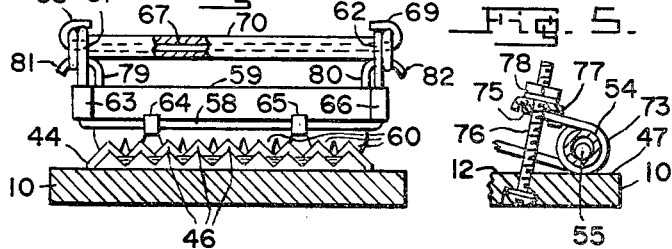

United States Patent Office 3,503,094
Patented Mar. 31, 1970

3,503,094
FISH CLAMPING TABLES
Lawrence J. Kennedy, 84 Windsor Ave.,
Flin Flon, Manitoba, Canada
Filed July 29, 1968, Ser. No. 748,453
Int. Cl. A22c 25/06
U.S. Cl. 17—70        5 Claims

ABSTRACT OF THE DISCLOSURE

Disclosed is a portable fish-supporting table having a long narrow top provided at one end portion with a transversely disposed clamp engageable with the head or tail of a fish lying lengthwise on the table top. The clamp includes a movable jaw that is spring urged toward a stationary jaw and that is provided with a handle bar usable for pulling the movable jaw toward its open position and also usable in carrying the table with its legs folded.

---

The present invention relates to improvements in portable supports for holding individual fish during scaling or filleting operations and more particularly to fish clamping tables adapted to support individual fish in a horizontal position to facilitate the work of scaling and filleting the fish.

An important object of my invention is to provide equipment for securely clamping a fish on a horizontal supporting surface either by its tail to facilitate scaling of the fish or by its head in the case of filleting and which clamping equipment will take and hold the fish head in any position of the fish that the filleter desires, that is, the fish may be positioned on either side, on its belly or back, in alignment with the clamping equipment or at an angle thereto.

Another important object of my invention is the provision of fish clamping equipment that will take and securely hold fish with a minimum tendency toward release or shifting of the fish thus reducing the danger of the filleter cutting his hands or fingers.

A further object of my invention is to provide clamping equipment which will take and securely hold fish of various sizes by engagement either with the relatively small tail portion of the fish or by its relatively wider and thicker head portion.

My invention also aims to provide a portable fish clamping table having folding legs that will not tend to swing or sway sideways during use of the table, and which legs, when folded, are compactly situated subjacent the table top to facilitate carrying the table, there being a handle bar forming a part of the clamping equipment which furnishes a grip for releasing the fish clamp and which handle bar may also be gripped during transportation of the table.

Other objects and advantages of my invention will become apparent during the course of the following detailed description, taken in connection with the accompanying drawing forming a part of this specification, and in which drawing, FIG. 1 is a top plan view of my portable fish clamping table with a fish clamped thereon, the legs being shown in their positions of use by full lines and in their folded positions by broken lines.

FIG. 2 is a view partly in side elevation and partly broken away and in central vertical longitudinal sections to show constructional details of my fish clamping table, the folded positions of the legs being shown by broken lines.

FIG. 3 is a bottom plan view of my fish clamping table, with the legs in their folded positions.

FIG. 4 is a view partly in elevation and partly in cross section of upper and lower clamping jaws and handle bar preferably forming part of the clamping equipment of the table.

FIG. 5 is a fragmentary detail view in vertical section of the clamping spring adjustment preferably forming part of my invention.

FIG. 6 is a view partly in side elevation and partly in central longitudinal section of a tapered spring guide forming part of my invention.

In the drawing which, for the purpose of illustration, shows a preferred embodiment of my invention, and wherein similar reference characters denote corresponding parts throughout the several views, the letter A generally designates my portable fish supporting and clamping table including a long narrow platform or top 10 dimensioned to support a fish N longitudinally of the table A. In the example shown the top 10 is formed of a 1″ dressed board 8″ wide and 4′ long and this size table top 10 I have found suitable for such fish as northern pike, muskellunge and large jackfish which may have heads 4″ to 5″ wide, 6″ to 7″ long, that is, to the gill, and up to 36″ long and longer. Swingably secured beneath the table top 10 at opposite end portions 11, 12 thereof, as by hinges 13, 14, are two pairs 15, 16 of wooden legs 17–20, the legs of each pair 15, 16 being rigidly connected together in a downwardly divergent relation by upper cross membess 21, 22 and intermediate cross members 23, 24 which keep the legs 17–20 from springing or spreading sideways. Each upper cross member 21, 22 may include a piece 25, 26 that abuts against the underside of the table top 10 and includes a beveled under surface 27, 28 releasably engageable by a rotary catch 29, 30. Each intermediate cross member 23, 24 may include a central cleat 31, 32 abutting the undeside of the table top 10 between spaced projections 33–36, when the legs are folded, and each releasably engageable by a rotary catch 37, 38. In the example shown the legs 17–20 are 19″ long and the divergent lower rounded ends 39–42 of the legs of each pair are 16″ apart. Mounted on one end portion 12 of the platform or top 10 is a fish clamp 43 including a stationary lower jaw bar 44 approximately 6½″ long that extends crosswise of the table top 10, includes a lower flange 45 screwed to the table top 10 and upstanding serrated teeth 46. Affixed to the marginal portion 47 of the table end 12 is a pair of spaced screw eyes 48, 49, the threaded shanks 50, 51 of which extend through the thickness of the table top 10 and are affixed against movement by nuts 52, 53. These spaced screw eyes 48, 49 provide annular bearings between which a tubular member 54 extends. Journaled in the bearings provided by said screw-eyes and extending into opposite ends of the tubular member 54 are inturned stub end portions 55, 56 of a U-shaped jaw member 57 formed of heavy rod or wire, the inturned stub end portions 55, 56 being shaft-like and rotating within the bearings 48, 49 and tubular member 54 upon swinging movement of the U-shaped jaw member 57 toward and away from the lower toothed jaw bar 44. The U-shaped jaw member 57 has a bight portion 58 to which is rigidly secured an upper jaw bar 59 having downwardly pointed serrated teeth 60. The teeth of the lower and upper jaw bars 44, 59 are sharply pointed with relatively dull base portions whereby the teeth 46, 60 will bite into and hold either end of a fish but will not tend to cut completely through the fish. By constructing the U-shaped member 57 of heavy wire or rod material, it is convenient for me to form single turns 61, 62 in the material adjacent the bight portion 58 and by so doing to downwardly directly direct the teeth of the upper jaw member 59 adjacent the single turns 61, 62, fastening the upper toothed bar 59 to the bight 58 by bending tab portions 63–66 of the bar 59 around the rod material. Extending between the spaced single turns 61, 62 I provide a connecting rod 67 having its ends 68, 69 hooked over the single turns 61, 62 by bending. In order to lift the upper jaw member 57, I provide this U-shaped member with a handle bar comprising a tube 70 encircling the connecting rod 67 between the spaced single turns 61, 62. Returning now to the tubular member 54 disposed between the spaced eye bolts 48, 49, I prefer to provide this component with tapering ends 71, 72 as detailed in FIG. 6. Encircling the tubular member 54 is a pair of oppositely wound spiral springs 73, 74 connected at adjacent ends by an integral loop 75 extending over the inwardly of the tubular members 54. Extending upwardly through the thickness of the table top 10 is a screw whose shank 76 passes upwardly through the loop 75 and is equipped with a washer-like stamped member 77 mounted on the loop 75 and a nut 78 for adjusting the tension of the spiral springs 73, 74. The outer end portions 79, 80 of the spiral springs 73, 74 extend parallel to the spaced sides of the U-shaped member 57 and include outturned ends 81, 82 passing through the single turns 61, 62 and thereby applying the force of the spiral springs 73, 74 downwardly against the bight portion 58 in a direction to move the upper jaw 59 into engagement with the lower jaw bar 44.

Assuming that the legs are folded as shown in FIG. 3, and it is desired to set up the table, the rotary catches 37, 38 are released by turning; each pair 15, 16 of legs is swung into extended position; and the rotary catches 29, 30 are turned into engagement with the beveled surfaces 27, 28 forming parts of the upper cross members 21, 22. With the table standing on its legs, the upper clamping jaw bar 59 is raised by pulling the handle bar 70 upwardly whereupon the head or tail portion of a fish may be inserted lengthwise into the clamp. Then the pull on the handle bar is released so as to permit downward engagement of the teeth of the upper jaw member 59 with the fish through the action of the spiral springs 73, 74. From an inspection of FIGS. 2 and 4 it will be seen that the movable upper jaw 59 is designed to close behind the stationary lower jaw bar 44 so that a pull on the fish such as produced during scaling or filleting tends to make the clamping jaws grip the fish harder. It will be understood that a more powerful clamping grip is desirable during scaling and filleting of large fish, and with this in mind, I have provided oppositely wound double spiral springs 73, 74 with relatively long outer end portions 79, 80 that permit the upper and lower jaws to be separated a considerable distance in order to accommodate large fish heads. The bigger the fish, the wider the upper jaw is opened against the torque exerted by the double spiral springs, and the harder the upper jaw bites in the case of the larger fish.

I claim:

1. Equipment for holding a fish during scaling or filleting comprising a long narrow platform dimensioned to support the fish longitudinally of the platform, said platform being provided at one end portion with a clamp, said clamp including a stationary lower jaw bar affixed to and extending transversely across said end portion inwardly of its marginal edge, said lower jaw bar having upstanding teeth, spaced bearings secured to the platform adjacent its marginal edge, a tubular member extending between said bearings, a U-shaped jaw member having inturned stub end portions journaled in said bearings and extending into opposite ends of said tubular member, and having a bight portion, an upper jaw bar secured to the bight portion of said jaw member and having downwardly pointed teeth, said U-shaped jaw member being swingable to guide the upper toothed jaw bar toward and away from the lower toothed jaw bar, and a spiral spring encircling said tubular member, said spring having one end anchored to said platform and another end connected to said U-shaped member, said spring urging said U-shaped member to swing in a direction to move the upper jaw bar teeth toward the lower jaw bar teeth whereby either end of a fish may be clamped on the platform.

2. Equipment as defined in claim 1, said U-shaped member including eye portions each adjacent an opposite end of the bight portion, and a rod extending transversely between and connected at its opposite ends to the eye portions, and a tubular handle bar carried by the rod.

3. Equipment as defined in claim 2, said spiral spring including oppositely wound end sections having their outer ends extending through said eye portions, and their inner ends connected to provide a loop swingable to vary the tension of said spiral spring sections, and screw threaded means connected between the platform end portion and said loop end threadably adjustable to vary the said spring tension.

4. Equipment as defined in claim 2, said platform constituting a table top, and being provided with two pairs of legs, each pair hingedly connected under a different end portion of the table top and swingable between extended and folded positions, and latches releasably securing said pairs of legs in either their extended or folded positions, said tubular handle bar being usable in pulling open the movable jaw, and also in carrying the table with the legs latched in their folded positions.

5. Equipment as defined in claim 1, said teeth being serrated with sharp pointed ends and dull base portions whereby the teeth will bite into and hold the fish but not tend to cut through the fish.

References Cited

UNITED STATES PATENTS

| 867,182 | 9/1907 | Bahde | 17—8 |
| 2,756,457 | 7/1956 | Banowetz | 17—8 |
| 3,093,859 | 6/1963 | Cooper | 17—8 |

LUCIE H. LAUDENSLAGER, Primary Examiner

U.S. Cl. X.R.

24—66